US012656124B2

(12) United States Patent
Patel et al.

(10) Patent No.: US 12,656,124 B2
(45) Date of Patent: Jun. 16, 2026

(54) DRONE PARCEL DELIVERY MATRIX-BASED SAFETY DETERMINATION

(71) Applicant: INTERNATIONAL BUSINESS MACHINES CORPORATION, Armonk, NY (US)

(72) Inventors: Sarvesh S. Patel, Pune (IN); Gandhi Sivakumar, Mountain View, CA (US); Kushal S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 18/471,685

(22) Filed: Sep. 21, 2023

(65) Prior Publication Data

US 2025/0102305 A1    Mar. 27, 2025

(51) Int. Cl.
| | |
|---|---|
| *G01C 21/20* | (2006.01) |
| *B64U 10/00* | (2023.01) |
| *B64U 101/64* | (2023.01) |

(52) U.S. Cl.
CPC .............. *G01C 21/20* (2013.01); *B64U 10/00* (2023.01); *B64U 2101/64* (2023.01)

(58) Field of Classification Search
CPC .... G01C 21/20; B64U 10/00; B64U 2101/64; B64U 10/14; B64U 10/13
See application file for complete search history.

(56) References Cited

U.S. PATENT DOCUMENTS

| | | | |
|---|---|---|---|
| 8,570,211 B1* | 10/2013 | Piesinger | ................ G01S 13/48 |
| | | | 342/29 |
| 9,494,937 B2 | 11/2016 | Siegel | |
| 9,552,736 B2 | 1/2017 | Taveira | |

(Continued)

FOREIGN PATENT DOCUMENTS

| | | |
|---|---|---|
| CA | 2956807 A1 | 2/2016 |
| CN | 106950985 B | 7/2020 |

(Continued)

OTHER PUBLICATIONS

Disclosed Anonymously, "Method and System for Predicting and Recommending Drone Travel Routes based on Historical Data and Real-time Data Feeds," IP.com Prior Art Database Technical Disclosure, IP.com No. IPCOM000241624D, May 18, 2015, 4 pages.

*Primary Examiner* — Scott A Browne

(74) *Attorney, Agent, or Firm* — Caleb D. Wilkes

(57) ABSTRACT

A computer-implemented method, a computer system, and a computer program product are provided. A first computer receives a message that indicates a destination location for a drone flight. The first computer generates a first recommendation for a route from a departure location to the destination location for the drone flight. The generating includes relying on a first safety matrix that represents a geographical area that includes the departure and destination locations. The first safety matrix includes rows and columns of numbers. Each number represents a first safety factor for a respective portion of a map that illustrates the geographical area. The generating also includes relying on a first analysis regarding a direct route between the departure and destination locations. The first analysis includes analyzing values of the first safety matrix along portions representing the direct route.

20 Claims, 10 Drawing Sheets

300

(56) References Cited

U.S. PATENT DOCUMENTS

| | | | | |
|---|---|---|---|---|
| 11,726,482 | B2 * | 8/2023 | Nigam | G06F 16/29 |
| | | | | 701/25 |
| 2015/0242972 | A1 | 8/2015 | Lemmey | |
| 2016/0284221 | A1 | 9/2016 | Hinkle | |
| 2018/0300834 | A1 * | 10/2018 | High | G05D 1/69 |
| 2021/0223777 | A1 * | 7/2021 | Nigam | G05D 1/0274 |
| 2021/0325907 | A1 * | 10/2021 | White | G08G 5/76 |
| 2021/0390868 | A1 * | 12/2021 | Ratajczak | G08G 5/53 |
| 2024/0257655 | A1 * | 8/2024 | Takemura | G08G 5/21 |

FOREIGN PATENT DOCUMENTS

| | | | |
|---|---|---|---|
| CN | 119668275 | A | 3/2025 |
| WO | 2021255870 | A1 | 12/2021 |

* cited by examiner

800

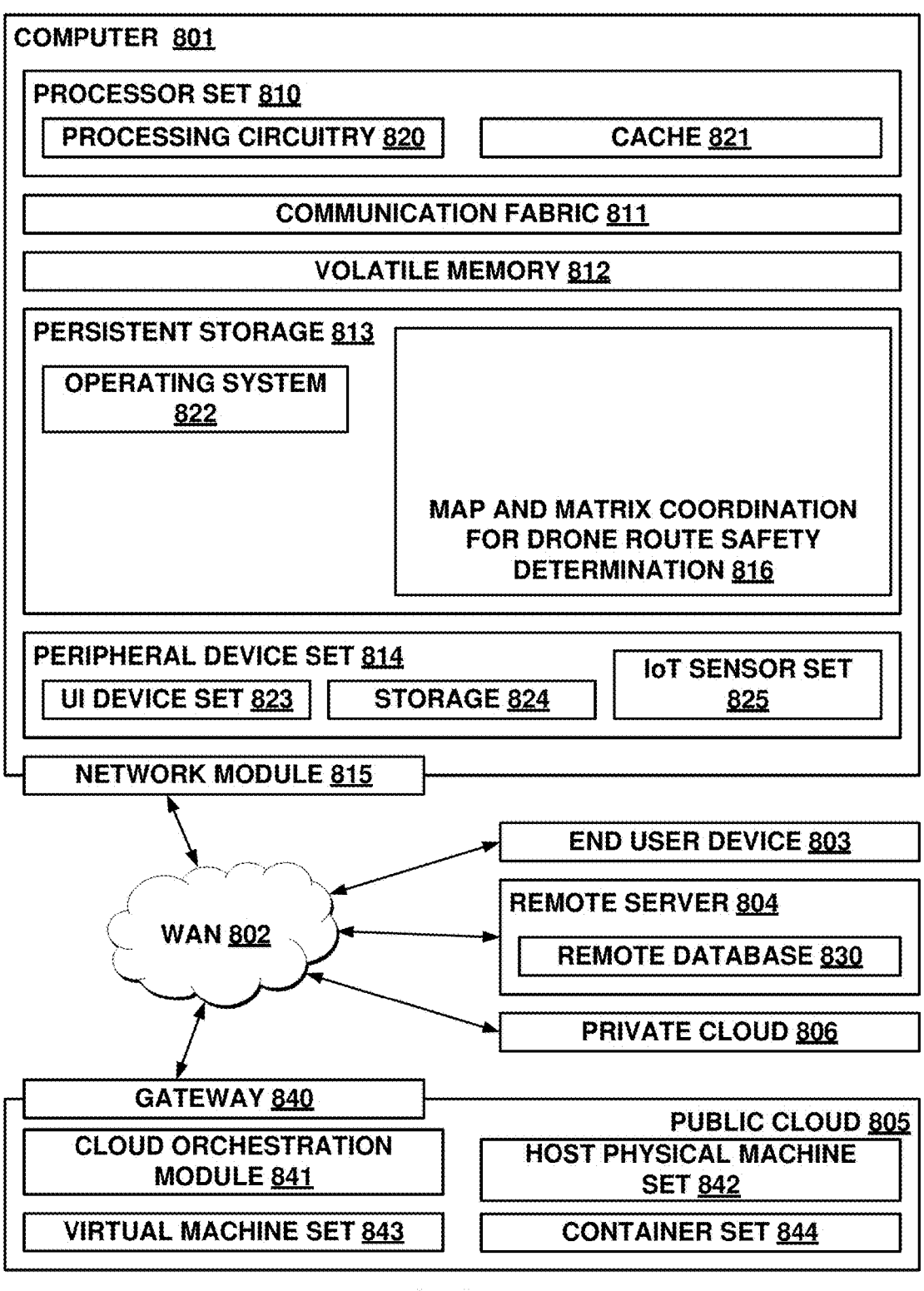

COMPUTER 801

PROCESSOR SET 810

PROCESSING CIRCUITRY 820          CACHE 821

COMMUNICATION FABRIC 811

VOLATILE MEMORY 812

PERSISTENT STORAGE 813

OPERATING SYSTEM 822

MAP AND MATRIX COORDINATION FOR DRONE ROUTE SAFETY DETERMINATION 816

PERIPHERAL DEVICE SET 814

UI DEVICE SET 823          STORAGE 824          IoT SENSOR SET 825

NETWORK MODULE 815

WAN 802

END USER DEVICE 803

REMOTE SERVER 804

REMOTE DATABASE 830

PRIVATE CLOUD 806

GATEWAY 840

PUBLIC CLOUD 805

CLOUD ORCHESTRATION MODULE 841

HOST PHYSICAL MACHINE SET 842

VIRTUAL MACHINE SET 843

CONTAINER SET 844

FIG. 8

DRONE PARCEL DELIVERY
MATRIX-BASED SAFETY DETERMINATION

BACKGROUND

The present invention relates generally to the field of aerial drones, parcel delivery that is performed via drones, automated map generation, and automated environmental sensing. An aerial drone is generally an unmanned aircraft and may sometimes be referred to as an unmanned aerial vehicle. An aerial drone is capable of being piloted and flying without an on-board human pilot. An aerial drone may be controlled using an on-board computer and pre-programmed instructions such that the drone operates autonomously. An aerial drone may alternatively or additionally as a remotely piloted aircraft be piloted by a human who controls the drone but who is positioned remotely from the drone. Maps and environmental sensing are used to help generate an aerial route for the drone to take on a flight such as a parcel delivery flight. Consumer goods are nowadays delivered via drone delivery.

SUMMARY

A computer-implemented method is implemented. A first computer receives a message that indicates a destination location for a drone flight. The first computer generates a first recommendation for a route from a departure location to the destination location for the drone flight. The generating includes relying on a first safety matrix that represents a geographical area that includes the departure and destination locations. The first safety matrix includes rows and columns of numbers. Each number represents a first safety factor for a respective portion of a map that illustrates the geographical area. The generating also includes relying on a first analysis regarding a direct route between the departure and destination locations. The first analysis includes analyzing values of the first safety matrix along portions representing the direct route. A computer system and a computer program product corresponding to this method are also provided herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 8 illustrates a networked computer environment in which drone safety routes with map to matrix coordination are carried out according to at least one embodiment.

DETAILED DESCRIPTION

Figure 1:
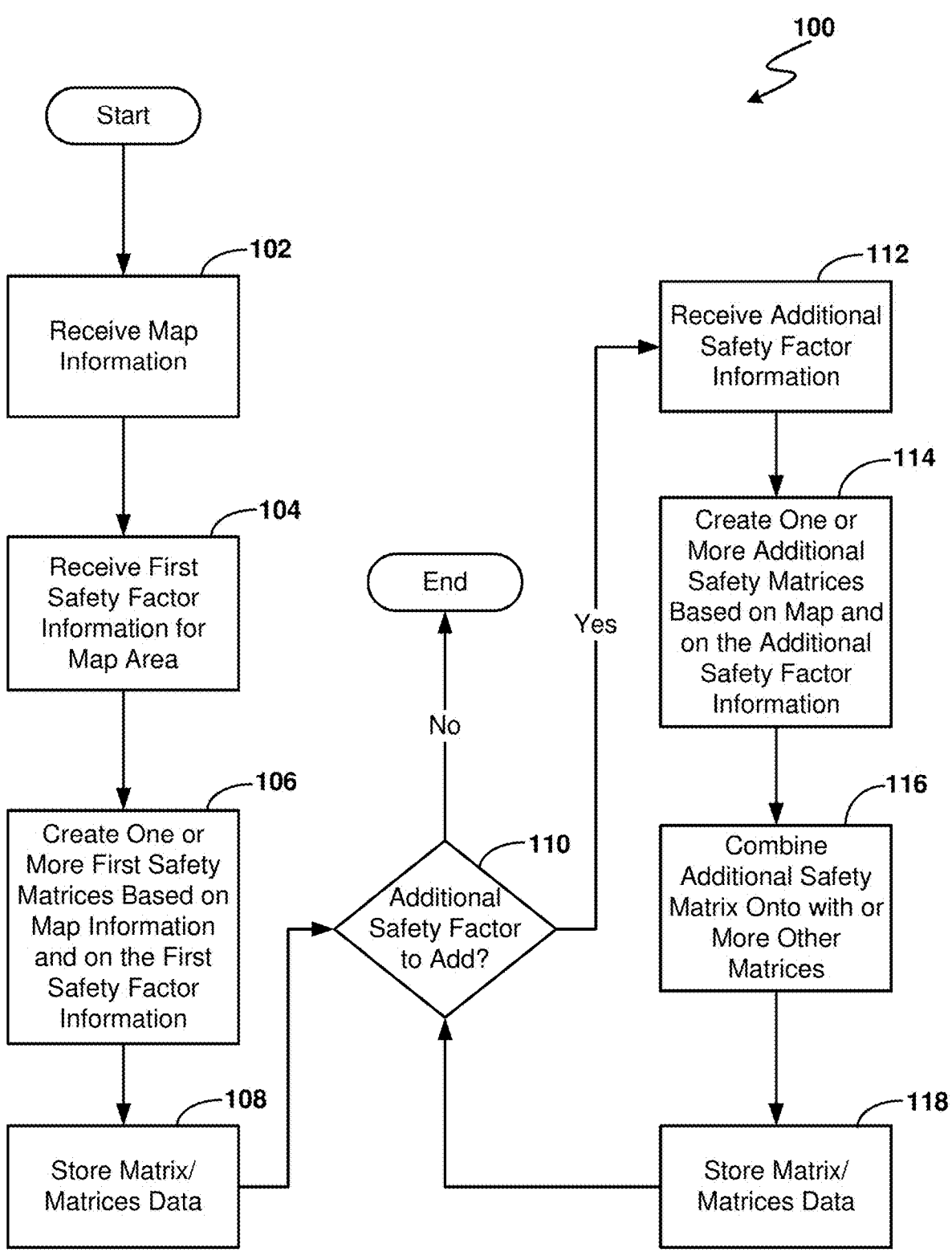
FIG. 1 is an operational flowchart illustrating a process for performing map to matrix coordination for safety conditions according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for generating, in an automated manner, an improved route for a flight of a drone to enhance safety of the drone and safety of any parcel that is transported and delivered via the drone via the flight. Delivery of goods, for example, after an online purchase of an item, are increasingly being carried out via drones that carry the item and fly to deliver the item to a drop-off or pick-up location of the purchaser. Consumers appreciate obtaining the good without having to appear in person in a public location. Consumers appreciate the convenience and privacy of contactless deliveries. Various goods including but not limited to medicines, food, groceries, electronic items, construction materials, etc. are now being delivered via drone delivery. Drone delivery has unique safety concerns such as being attacked by birds who feel threatened and who seek to defend what they consider to be their territory. Damage to a drone itself and/or to a parcel being carried and delivered by a drone is at least a nuisance and in many instances an expensive problem for the drone owner and/or operator, the item provider, and the item receiver. Also when a drone inadvertently drops a parcel in a roadway the parcel has a high chance of becoming damaged via a vehicle traveling along the roadway. A parcel dropped in a road could also endanger drivers and cause a traffic accident. For parcels that do not float, dropping a parcel in water leads to a likely sinking and loss of the parcel. Dropping the parcel in a safer softer ground such as a grass field would lead to less chances of parcel damage and higher chances of parcel recovery. Other safety factors besides roads/traffic and birds/wildlife also can affect a drone delivery. The present embodiments enhance drone and package delivery safety by automatically identifying safer routes for drone flights. The identification incorporates sensor information and artificial intelligence to generate a route recommendation. The route recommendation is sent to a drone to guide its delivery flight and/or other flight.

The present embodiments combine features of automated gathering of data with location information, transferring the data to one or more matrices which represent a map with the relevant locations, and analyzing the matrices to determine a safe route for the drone to fly from a departure location to a destination location such as a delivery destination location. This use of map to matrix coordination and applying artificial intelligence using matrices to find a safe, safer, or safest flight route for a drone results in a higher completion percentage for the deliveries and also in a higher recovery percentage for any drone accident that occurs. The present embodiments can, therefore, reduce drone maintenance costs, drone repair costs, and drone replacement costs, as well as parcel repair and/or replacement costs.

FIG. 1 shows an operational flowchart illustrating a first process 100 of at least one embodiment for performing map-to-matrix coordination for drone safety conditions. This first process 100 may be implemented using one or more portions of a map-to-matrix coordination and drone safety route determination program 816 of a computer 801 shown in FIG. 8. The automated route determination program 816 may include and/or access various modules, user interfaces, services, machine learning models, databases, and natural language processing tools and may use data storage when performing the first process 100. The first process 100 represents a preparatory stage where safety information for a geographical region is gathered and processed to be stored in one or more matrices so that the map-to-matrix coordination and drone safety route determination program 816 can subsequently access the one or more matrices to identify a best route for a drone to make a delivery between two identified points.

In a step 102 of the first process 100, map information is received. In some embodiments, the map information is received via a data transmission from an external computer via the wide area network 802 shown in FIG. 8 to the computer 801. At the computer 801, the map information flows to the map-and-matrix coordination for drone route determination program 816. In some embodiments, the map information is acquired from another entity, e.g., via a purchase from another entity that has used various means such as image gathering to generate one or maps that depict various geographical areas. In some embodiments, the step 102 includes actively capturing images of a geographical area and using those images to generate a map that depicts various geographical areas. In some embodiments, images are captured via a satellite, e.g., a low-earth orbiting (LEO) satellite, that is orbiting the earth. In some embodiments, images are captured via an airplane and/or via an automobile vehicle which has a camera attached thereto. Image information is associated with latitudinal and longitudinal information so that depictions of earth features are generated on the two-dimensional or three-dimensional map for a geographical area. The map information includes features such as physical structures, e.g., buildings, houses, monuments, etc., at a particular longitude-latitude combination. The map information includes features such as roads throughout a geographical area. The map information includes information such as vegetation and vegetation types over a particular geographical area. In some embodiments, the map information is used to generate a visual map that is stored in computer memory such as in the persistent storage 813 and/or in additional computer memory storage such as that in the remote server 804. In some embodiments, the map information is used to generate a combination of textual information describing a physical area, with the textual information being organized into areas for the map. Thus, in this instance the map information together helps provide information about a geographical area stored in a way to approximate the arrangement of the physical area without actually providing a visual map. In some embodiments, a map owner already owns map information for various geographical areas and, therefore, performs step 102 by accessing this map information from their data storage such as from data storage in one or more remote servers 804.

In some embodiments, the map information that is received is sufficient to form a two-dimensional map of a geographic area. On that basis, the drone route that is generated (as part of the second process 200 shown in FIG. 2) and eventually transmitted to the drone to guide the drone includes latitude and longitude information to guide the drone. The map is based off of <x, y> axis information. In this instance, a direct route is interpreted as recommending a standard altitude for drone height during the drone flight. The standard altitude is based on standards for the drone industry at large or on particular experiences of a particular drone operator.

In some embodiments, the map information that is received is sufficient to form a three-dimensional map of a geographic area. On that basis, the drone route that is generated (as part of the second process 200 shown in FIG. 2) and eventually transmitted to the drone to guide the drone includes an altitude component in addition to a latitude and longitude information to guide the drone. The map is based off of <x, y, z> axis information. On this basis, an alternative route that is generated can include not only deviations in latitude and longitude but also deviations in altitude to avoid one or more dangerous areas.

In a step 104 of the first process 100, first safety factor information is received. In some embodiments, the first safety factor information is received via a data transmission from an external computer via the wide area network 802 shown in FIG. 8 to the computer 801. At the computer 801, the first safety factor information flows to the map and matrix coordination for drone route determination program 816. The first safety factor information relates to a first safety condition such as to road/street orientation in a geographical area, the presence of birds in the area which represent a physical danger to drones of a certain size, the type of surface materials over the surface of the earth in a geographical area such as water (for lakes, rivers, ponds, streams, ocean, etc.), vegetation, rocks, etc., to wind patterns over a particular geographical area, etc. Road information is able to be gathered via image capturing and/or via legally accessing road maps that were generated by another entity. In some embodiments, road information includes traffic information and patterns which indicate the number of cars that use a particular road over a particular time interval. In some instances, bird presence is identified via images captured from a satellite orbiting the earth.

The first safety factor includes information associating the various factors with particular geographical segments. For example, a geographical area depicted by the first map 300 shown in FIG. 3 is divided into map areas, such as a first map area 302, via the combination of latitude and longitude lines.

Figure 3:
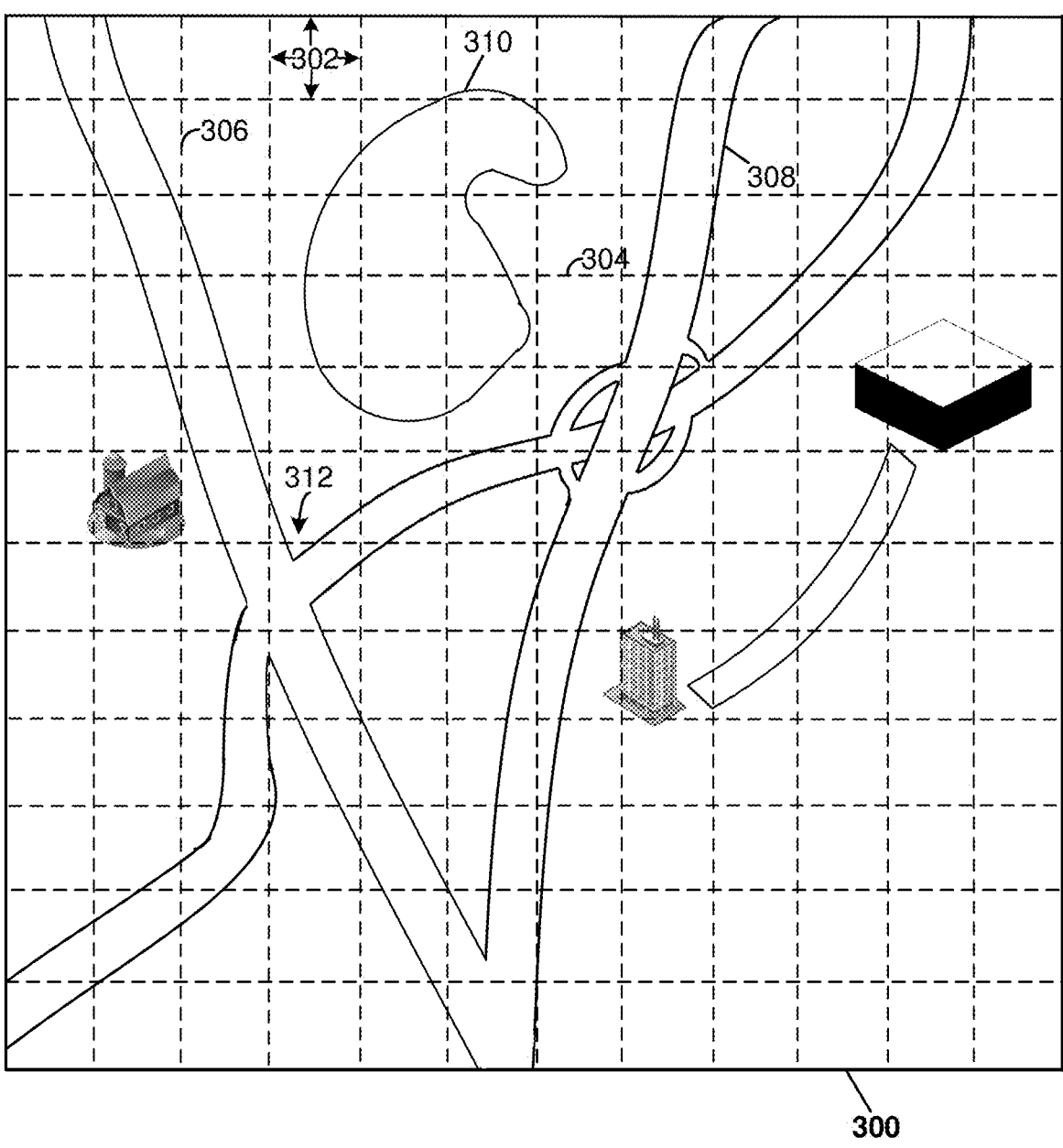
FIG. 3 illustrates a latitude and longitude grid map that may be involved in the processes of FIGS. 1 and 2 according to at least one embodiment.

FIG. 3 shows a first latitude line 304 amongst other latitude lines and a first longitude line 306 amongst other longitude lines. The first safety factor information is captured and stored per area grid/segment/region. Thus, if some areas but not other areas include a road, a body of water, and/or a high presence of attacking birds, etc., this information is stored to be associated with that particular map area. For example, the safety factor information is stored associated with a map area label which indicates which area of the map has that safety-affecting feature and/or the intensity level of the safety-affecting feature. The map area label in some embodiments includes latitude and longitude coordinates and/or ranges of latitude and longitude coordinates. For those areas without the safety factor, a segment of information is stored associated with these areas and indicating a lack of or a reduced safety threat there from the particular danger.

The first safety information in some embodiments also includes different information depending on a particular time of day, day of week, and/or season of the year associated with the time of capturing of safety information. For example, some information for a particular map sub-region indicates a high threat during morning or during the winter and a low threat during the evening or during the summer.

In a step 106 of the first process 100, one or more first safety matrices based on the map information and on the first safety factor information is/are created. The map information refers to the map information that was received in step 102. The first safety factor information refers to that information that was received in step 104. The map and matrix coordination for drone route determination program 816 applies one or more pre-stored rules and/or policies to the information in order to perform step 106 to generate the safety matrix or the safety matrices. In some embodiments a user selects weights to help the map and matrix coordination for drone route determination program 816 determine numerical values for the safety factor information to apply to a particular map area.

The first safety matrix that is generated in step 106 includes rows and columns of numbers. Each number represents a first safety factor value for a respective portion of a map that illustrates the geographical area. The first map 300 shown in FIG. 3 includes a first map area 302 which is shown on that map portion as being the fourth map area from the left and in a top (e.g., first) row of map areas. For performing step 106, a first safety factor value for the first map area 302 would be inserted into the first safety matrix in the first row, fourth column position of the first safety matrix. The numerical value represents a safety evaluation for that area with respect to the particular safety issue within that part of the geography. This numerical value would be placed in the first row, fourth column position of the first safety matrix. Although only a first map area 302 is numerically identified in FIG. 3, a numerical value may be generated for other (all or some) positions of the matrix. Those other positions of the matrix correspond to the various map areas shown in the depicted first map 300. For example, this particular example shows the first map 300 divided into one hundred and forty-four square map areas in twelve rows of map areas and twelve columns of map area. A safety matrix generated in step 106 for this depicted division of the first map 300 would include one hundred and forty-four numerical values arranged in twelve rows and in twelve columns. Because the matrix is generated based on safety analysis for a particular feature, each number in a single matrix is related to the safety concern for that particular feature for a respective map sub-region. In other words, the first safety matrix in some embodiments is full of numbers each indicating a threat of bird attack over the various sub-regions of the map. In another embodiment, the first safety matrix is full of numbers each indicating whether the respective map sub-region passes over a road or a busy road. Other embodiments include a set of numbers referring to other safety conditions that could effect a drone flight.

In at least some embodiments, the numerical values for the safety matrix are selected from a range that extends from a minimal value to a maximal value. For example, in some embodiments the range extends from zero to ten with zero being an indication of no concern about that safety factor in a particular map area and ten being an indication of maximum concern about that safety factor in a particular map area. In some embodiments the concern is only indicated as present or not present for a particular area in that either a one value or a zero value is entered for each matrix position (to represent either a concern ("1") or no concern ("0") for a particular safety factor in a particular map area). In some embodiments a user is prompted to select the range of values for a particular safety factor. Thus, a user is permitted to choose how the received safety information is scaled into the particular numbers inserted into the matrix. The map and matrix coordination for drone route determination program 816 prompts the user via a user interface such as a graphical user interface displayed on a display screen of the computer 801 to capture this user selection. In other embodiments, the program 816 provides a default selection of the range of values. A larger range selected allows each matrix to capture more particular, fine-grained safety information. In some embodiments, the program 816 applies an algorithm to generate an appropriate range and scale based on safety information that is received. For example, for tracking presence of attacking birds, a number of birds identified in a particular geographical area within a particular time frame is provided as input to the algorithm for the various areas. In response, the algorithm automatically identifies a maximum number of bird sightings and the range of differences amongst the various areas and then converts those numbers into an appropriate range. In some embodiments for road information, numbers of vehicles which drive through a road area in a particular time frame are captured via sensor information to determine a traffic rating, e.g., a numerical value between zero to ten, for that road area.

Figure 4A:
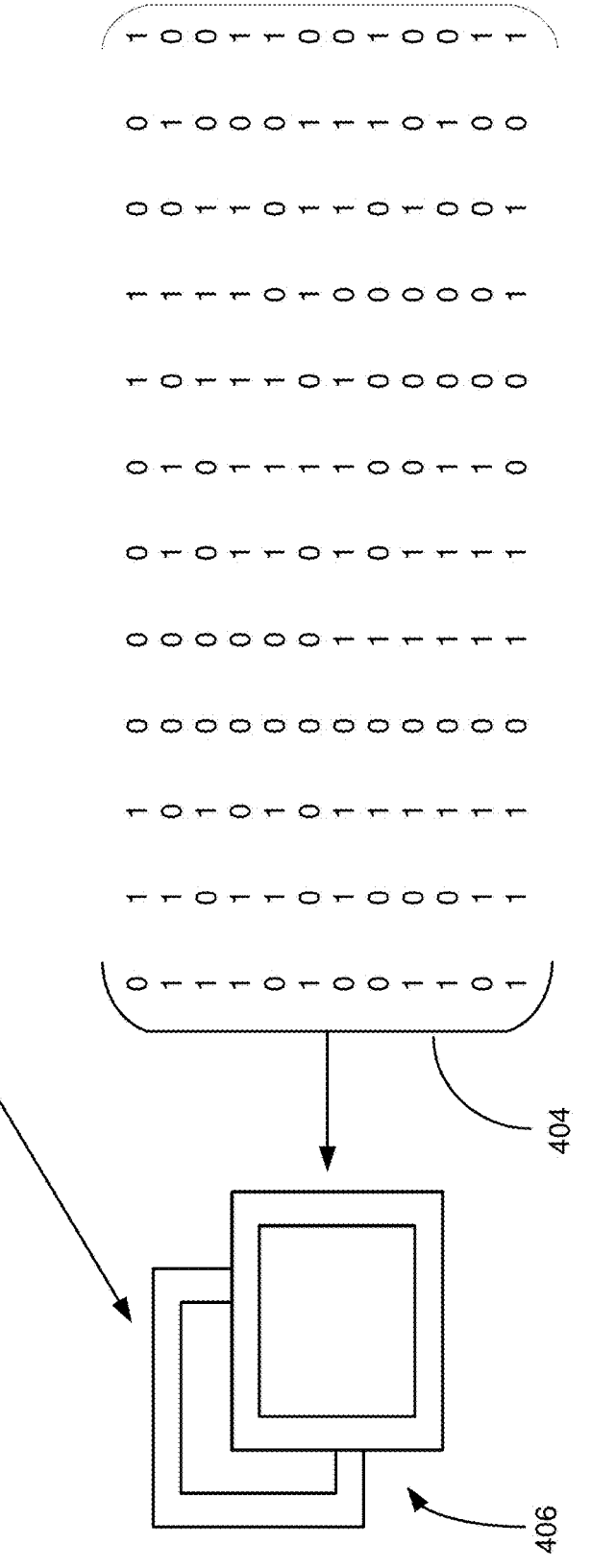
FIG. 4A illustrates safety matrices that according to at least one embodiment may be generated in the process of FIG. 1 and used in the process of FIG. 2 and according to at least one embodiment are combined with each other.

FIG. 4A depicts two exemplary matrices that can be formed through the performance of step 106. FIG. 4A shows a first example matrix 402 and a second example matrix 404. These first and second example matrices 402, 404 have twelve rows and twelve columns of numerical values, due to these matrices being a size match for the map divisions shown for the first map 300 shown in FIG. 3. The first example matrix 402 has a range of zero to ten for safety factor values for the different matrix elements and, therefore, for the different portions of the map. The second example matrix 404 has a binary range of zeroes and ones meaning that this matrix only indicates a presence or no presence of a safety factor for a respective matrix element and, therefore, for the different portions of the map instead of indicating a severity level of the danger. The second example matrix 404 indicates safety concern about a safety factor that is different from the safety concern indicated by the first example matrix 402. The matrices shown in FIG. 4A correspond to two-dimensional maps. For three-dimensional maps with different vertical layers of sub-regions, a separate matrix is present/generated for each vertical layer of the three-dimensional map.

Figure 4B:
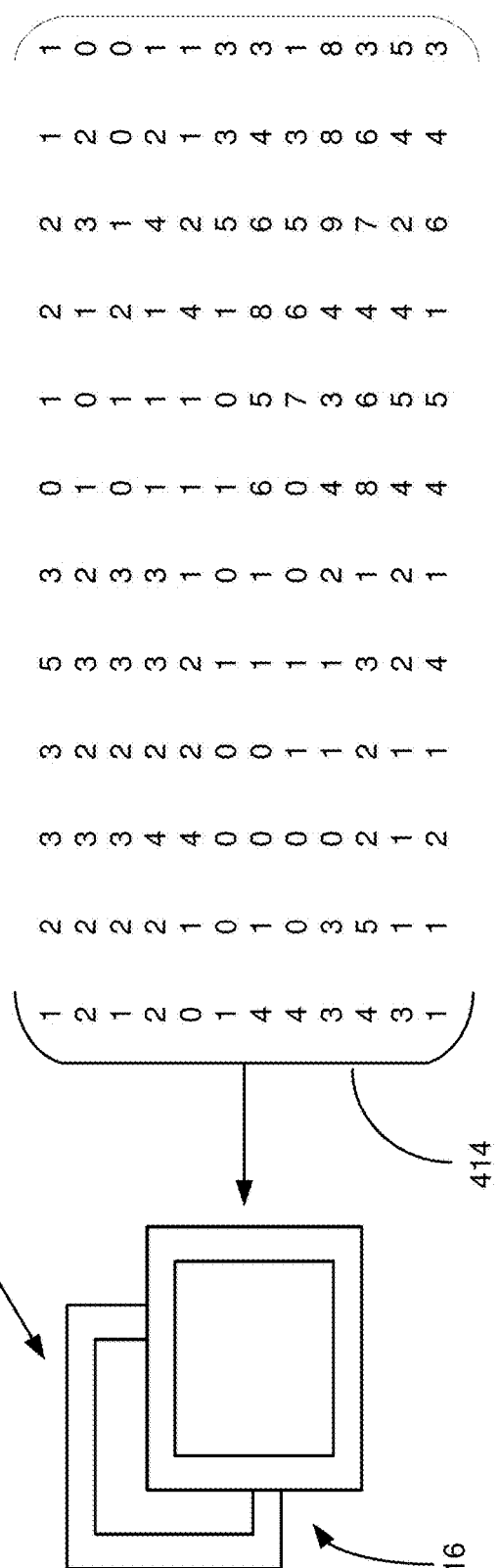
FIG. 4B illustrates another set of safety matrices that according to at least one embodiment may be generated in the process of FIG. 1 and used in the process of FIG. 2 and according to at least one embodiment are combined with each other.

FIG. 4B depicts two exemplary matrices that can be formed through the performance of step 106. FIG. 4B shows the first example matrix 402 (that was also shown in FIG. 4A) but also a third example matrix 414. The third example matrix 414, like the first and second example matrices 402, 404, has twelve rows and twelve columns of numerical values, due to this matrix being a size match for the map divisions shown for the first map 300 shown in FIG. 3. Like the first example matrix 402, the third example matrix 414 also has a range of zero to ten for its safety factor values for the different matrix elements and, therefore, for the different portions of the map. The third example matrix 414 indicates safety concern about a safety factor that is different from the safety concern indicated by the first example matrix 402 and different from the safety concern indicted by the second example matrix 404.

In some embodiments, different matrices for a respective single safety factor are generated based on different temporal factors such as time of day, day of week, and/or season of the year. Thus, for a single geographical area multiple matrices for the same safety factor are generated in this embodiment. In some areas, bird presence is higher for a particular season (e.g., summer months) and lower for other seasons (e.g., winter months). Thus, matrices for a single geographical map area have different safety factor values depending on temporal conditions. For example, for bird conditions one geographical area has a seasonal matrix depending on the season—e.g., a summer matrix, fall matrix, winter matrix, spring matrix, etc. In some areas, vehicular traffic is higher at certain times of day. Therefore, for a single geographical area a set of matrices is created including a morning rush hour matrix, a mid-day matrix, an evening rush hour matrix, a late evening matrix, a nighttime matrix, etc.

In a step 108 of the first process 100, the matrix/matrices data is stored. This information is stored in computer data storage such as in the persistent storage 813 of the computer 801 and/or in additional storage accessed via the cloud such as in one or more remote servers 804. The matrix information is stored in a manner so as to be accessible to the program 816 in performing the second process 200 shown in FIG. 2 for determining a best safe route for a drone that is to travel in the geographical area represented by the matrix.

In a step 110 of the first process 100, a determination is made whether there is an additional safety factor to add. In response to an affirmative determination in step 110 in that there is an additional safety factor to add, the first process 100 proceeds to step 112 to start a loop of steps 112, 114, 116, and 118. In response to a negative determination in step 110 in that there is no additional safety factor to add, the first process 100 proceeds to the end of the first process 100. To perform the determination of step 110, in some embodiments the program 816 checks a computer memory data queue to evaluate whether in the queue there is any more indicators of any sets of additional safety information being available in data storage. In some embodiments, a user presets, via interacting with a user interface of the program 816, a number of safety factors that the user would like to be included for the safety analysis. In these embodiments, the determination of step 110 includes accessing the user selection and comparing the number of safety factors that have been analyzed to the selected user number. Choosing a larger number of safety factors to include increases accuracy of the program 816 in determining a safe route for a drone flight but can also increase cost to gather and/or access and/or analyze one or more additional sets of safety information.

In a step 112 of the first process 100 along the loop of steps 112, 114, 116, 118, additional safety factor information is received. The receiving of step 112 is analogous to the receiving of the first safety factor information of step 104. In some embodiments, the additional safety factor information is received via a data transmission from an external computer via the wide area network 802 shown in FIG. 8 to the computer 801. At the computer 801, the additional safety factor information flows to the map and matrix coordination for drone route determination program 816.

In a step 114 of the first process 100 along the loop of steps 112, 114, 116, 118, one or more additional safety matrices based on the map and on the additional safety factor information is created. The matrix creation of step 114 is analogous to the matrix creation of step 106. FIG. 4A shows two matrices and FIG. 4B shows a different set of two matrices. Any of these matrices may be generated via step 114 while another of the matrices was generated via step 106.

In a step 116 of the first process 100, the additional safety matrix is combined with one or more other matrices. These one or more other matrices refers to the one or more other matrices created in step 106 or in previous iterations of the loop of steps 112, 114, 116, 118. In at least some embodiments the combining includes adding matrix elements of the first matrix to corresponding matrix elements of the second matrix to produce a new combination matrix. In other words a numerical value that is a matrix element and has a specific row number and column number in the first matrix is added and/or combined to a numerical value that is a matrix element and has the same specific row number and column number in the second matrix. This same specific row number and column number is referred to as a corresponding position. This combining of the various matrix elements produces a combination matrix. In some embodiments, the combining of a twelve by twelve matrix with another twelve by twelve matrix produces a combination matrix that is also a twelve by twelve matrix. In some embodiments matrices of different sizes are combined with each other. For three-dimensional maps, the values within a single vertical layer are added to the corresponding values of the corresponding vertical layer of the other matrix.

In some embodiments, a smaller matrix of a matrix pair or group is enlarged to equal the dimensions of a second matrix from the pair before the two matrices are combined with each other. This enlargement in some embodiments includes duplicating certain values to fill other positions of the enlarged matrix. For example, a six by six matrix is enlarged by generating four matrix elements from each original matrix element of the six by six matrix. The new four matrix elements fill the same (enlarged and divided) segment of the map area that the original matrix element represented. This process results in a twelve by twelve matrix. The program 816 performs this enlargement in an automated manner.

In some embodiments, a larger matrix of a matrix pair or group is reduced in size to equal the dimensions of a second matrix from the pair before the two matrices are combined with each other. This size reduction in some embodiments includes averaging certain values to create a single value for the reduced-size matrix. For example, a twelve by twelve matrix is reduced in size by averaging four original matrix elements to produce a single matrix element (that is the average result). The new single matrix element fills the same (shrunk and combined) segment of the map area that was previously for the original four matrix elements. This process results in a six by six matrix. The program 816 performs this size reduction in an automated manner.

Thus, in at least some embodiments matrices having different dimensions are added to or accessed by the program 816 and the program 816 appropriately adjusts the values of the smaller or larger matrix to produce an output matrix that has the same dimensions as the larger or smaller matrix, respectively. In at least some embodiments, the program 816 performs this combination without favoring the values of either the smaller or larger matrix but equally weighting these two matrices for the combination.

In at least some embodiments, the program 816 also effectively combines, e.g., adds, matrices of different dimensions or of the same dimensions when the safety factor values have different ranges. In this instance, based on the range size a value in a first matrix can have a superficial distorted value compared to a value in a second matrix. A "3" value in a range of zero to three has a different safety meaning than a "3" value in a range of zero to ten. The program 816 automatically calibrates different ranges so that these different matrices can nevertheless be effectively combined with each other, e.g., added to each other, without having overwhelming distortion. For example, with the first matrix 402 in FIG. 4A having values from a range of zero to ten and the second matrix 404 in FIG. 4B having binary values of "0" or "1" distortion could occur in trying to perform straight adding of values of the first matrix 402 to values of the second matrix 404. In some embodiments, the program 816 compensates for these different ranges by calibrating one set of values to another set of values. In one mode of calibration, the program 816 considers all "1" values of the second example matrix 404 as values of "5" for addition to the values of the first example matrix 402.

In at least some embodiments, a user can pre-select weights to have one safety factor valued higher than other safety factor for the combination. For example, if a user is more worried about bird attacks than about flying over roads, the user pre-selects via a user interface of the program 816 to have the bird presence safety information weighted higher than the road information. The program 816 then adjusts the bird safety values upwards, the road safety values downwards, or performs both of these adjustments as a pre-cursor to the matrix combination.

In a step 118 of the first process 100, the matrix/matrices data is stored. This information is stored in computer data storage such as in the persistent storage 813 of the computer 801 and/or in additional storage accessed via the cloud such as in one or more remote servers 804. The matrix information is stored in a manner so as to be accessible to the program 816 in performing the second process 200 shown in FIG. 2 for determining a best safe route for a drone that is to travel in the geographical area represented by the matrix. This data includes the new one or more additional matrices formed as well as the new one or more combined matrices formed via the combination of step 116 that combines the various matrices with each other.

After step 118, the first process 100 proceeds for a repeat of the determination of step 110. There at step 110 another determination is made as to whether there is an additional safety factor to add. In response to an affirmative determination in step 110 in that there is an additional safety factor to add, the first process 100 proceeds to step 112 for a repeat of the loop 112, 114, 116, 118 for the further additional safety factor. Additional safety matrices are formed in further iterations of the loop and additional matrix combinations are performed and stored in the further iterations. In response to a negative determination in step 110 in that there is no additional safety factor to add, the first process 100 proceeds to the end of the first process 100. Although FIGS.

4A and 4B show combinations of two sets of matrices, in other embodiments more than two matrices are combined to make a new combination of matrices. For example, the step 116 could combine three matrices, four matrices, five matrices, etc.

Figure 2:
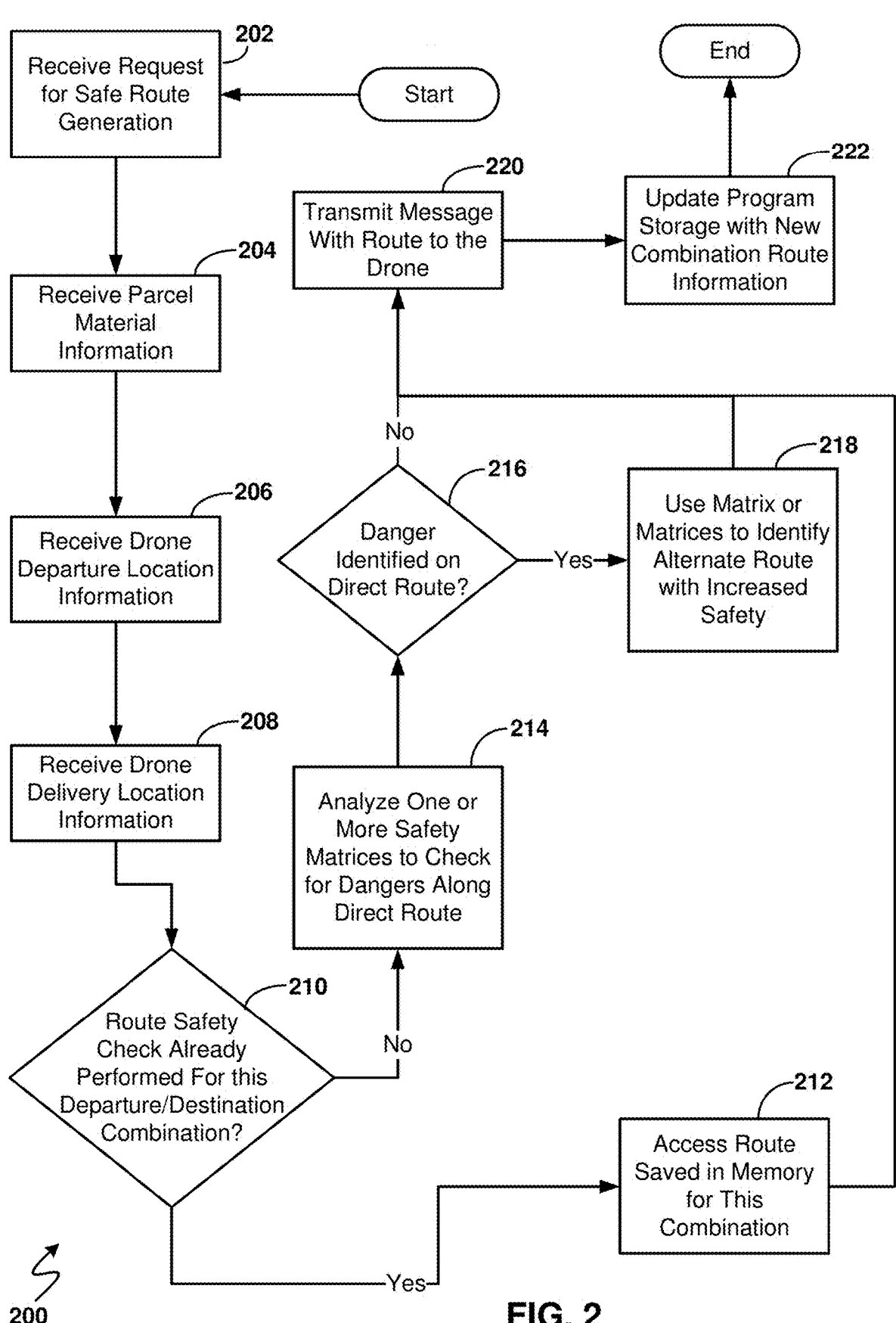
FIG. 2 is an operational flowchart according to at least one embodiment illustrating a process for generating a drone route using one or more matrices that were generated according to the process illustrated in FIG. 1.

FIG. 2 shows an operational flowchart according to at least one embodiment illustrating a second process 200 for generating a drone route using one or more matrices that were generated according to the first process 100 illustrated in FIG. 1 and described above. The second process 200 may be implemented using one or more portions of the map-to-matrix coordination and drone safety route determination program 816 shown in FIG. 8. The automated route determination program 816 may include and/or access various modules, user interfaces, services, machine learning models, databases, and natural language processing tools and may use data storage when performing the second process 200.

In a step 202 of the second process 200, a request for safe route generation is received. In some embodiments, this request is received via a data transmission from an external computer via the wide area network 802 shown in FIG. 8 to the computer 801. At the computer 801, the request flows to the map and matrix coordination for drone route determination program 816. In some embodiments, the request is sent by an entity who controls a drone who has a pending flight route to take, e.g., has a pending delivery to make. In some embodiments, the drone operator has an instance of the map and matrix coordination for drone route determination program 816 at their own computer, e.g., owns the computer 801, so that the request of step 202 occurs via accessing a user interface of the program 816 and initiating, via the user interface, the second process 200 to receive drone route generation.

In some embodiments, the program 816 is implemented at the drone delivery station. In some embodiments, the program 816 is implemented in a commonality framework that can be accessed depending on the incoming requests to the drone route finder. A drone operator holds a program instance on its computer and requests data from a central instance of the program 816, e.g., in the cloud. The service requests the resources and loads the metadata repository about drone and geography information.

In a step 204 of the second process 200, parcel material information is received. In some embodiments, the parcel material information is received via a data transmission from an external computer via the wide area network 802 shown in FIG. 8 to the computer 801. At the computer 801, the parcel material information flows to the map and matrix coordination for drone route determination program 816. In some embodiments, the parcel material information includes a size information of a parcel that is to be carried by the drone in a drone flight. In some embodiments, the parcel is to be carried and then dropped off at a destination location for delivery of the parcel. In some embodiments, the parcel material information includes a description of contents of the parcel. In some embodiments, a level of fragility of the material of the parcel is indicated with the parcel material information. In other embodiments, the program 816 determines a level of fragility based on the indicator of the contents of the parcel. The program 816 applies one or more pre-set policies and/or rules to perform this fragility determination. In some embodiments, the parcel information indicates whether the parcel and/or its contents is/are able to float on water. In some embodiments, the parcel information includes whether the parcel contains any material that makes the delivery time sensitive, e.g., contains frozen materials that need to be returned soon to a freezer. In some embodiments in which the drone operator controls the program 816, the drone operator is able to enter the parcel material information via engaging with a user interface of the program 816. In some embodiments, a data packet contains the parcel material information and this data packet is forwarded to the program 816 for analysis.

In at least some embodiments, the program 816 initiates in-band data collector application programming interfaces (APIs) which will connect the drone delivery initiator function to request the parcel information so that the allocation can be made. The information from the initiator service requesting the drone route safety check will be released to the drone station with the details of the parcel. This information is presented in metadata. Tags of the metadata are classified at the service to understand the details. For example, the tags indicate one or more of fragile, big, small, medium-sized, heavy, etc. The present embodiments prefer in-band communication between computers instead of out-of-band communication for convenience of avoiding the downloading of new modules and/or of avoiding installation of new hardware in order to perform the methods described herein.

The program 816 on the computer 801 (see FIG. 8) in some embodiments represents a central controller and an end user device 803 (see FIG. 8) includes an application programming interface to communicate with the central program 816. The end user device 803 includes one or more of a map application, a global positioning system (GPS) location collector, a device integrator, and a drone delivery service. The end user device 803 includes a centralized controller. The central program 816 includes one or more of an initialization engine, a subscription validators, a generator, and a matrix combiner/analyzer. Communications may occur between the program instance on the end user device 803 and the central program 816, e.g., via a wide area network 802 (see FIG. 8), to perform various tasks such as user registry and the drone route matrix-based safety checks as described herein.

For example, in some embodiments for user registration and subscription validator the central controller with program 816 stores user ID information in a table such as shown in Table 1 below:

TABLE 1

| USER_ID | VALID |
|---------|-------|
| 0x1102345 | YES |
| 0x1102357 | NO |
| 0x1102397 | YES |
| 0x1103456 | YES |
| 0x1102399 | NO |

For example, in some embodiments for checking on accuracy of user data the central controller with program 816 stores user location information in a table such as shown in Table 2 below. The X and Y information in some embodiments refers to latitude and longitude coordinates, respectively.

TABLE 2

| USER_ID | LOCATION_CURR | |
|---------|---------------|---|
| 0x1102345 | X1 | Y1 |
| 0x1102357 | X2 | Y2 |
| 0x1102397 | X3 | Y3 |
| 0x1103456 | X4 | Y4 |

TABLE 2-continued

| USER_ID | LOCATION_CURR | |
|---------|---------------|---|
| 0x1102399 | X5 | Y5 |

For example, in some embodiments for checking on currency of a user subscription for the drone route safety check program, the central controller with program 816 stores user subscription information in a table such as shown in Table 3 below:

TABLE 3

| USER_ID | SUBSCRIPTION |
|---------|--------------|
| 0x1102345 | SUBSCRIBED |
| 0x1102357 | NOT_SUBSCRIBED |
| 0x1102397 | SUBSCRIBED |
| 0x1103456 | SUBSCRIBED |
| 0x1102399 | SUBSCRIBED |

Figure 6:
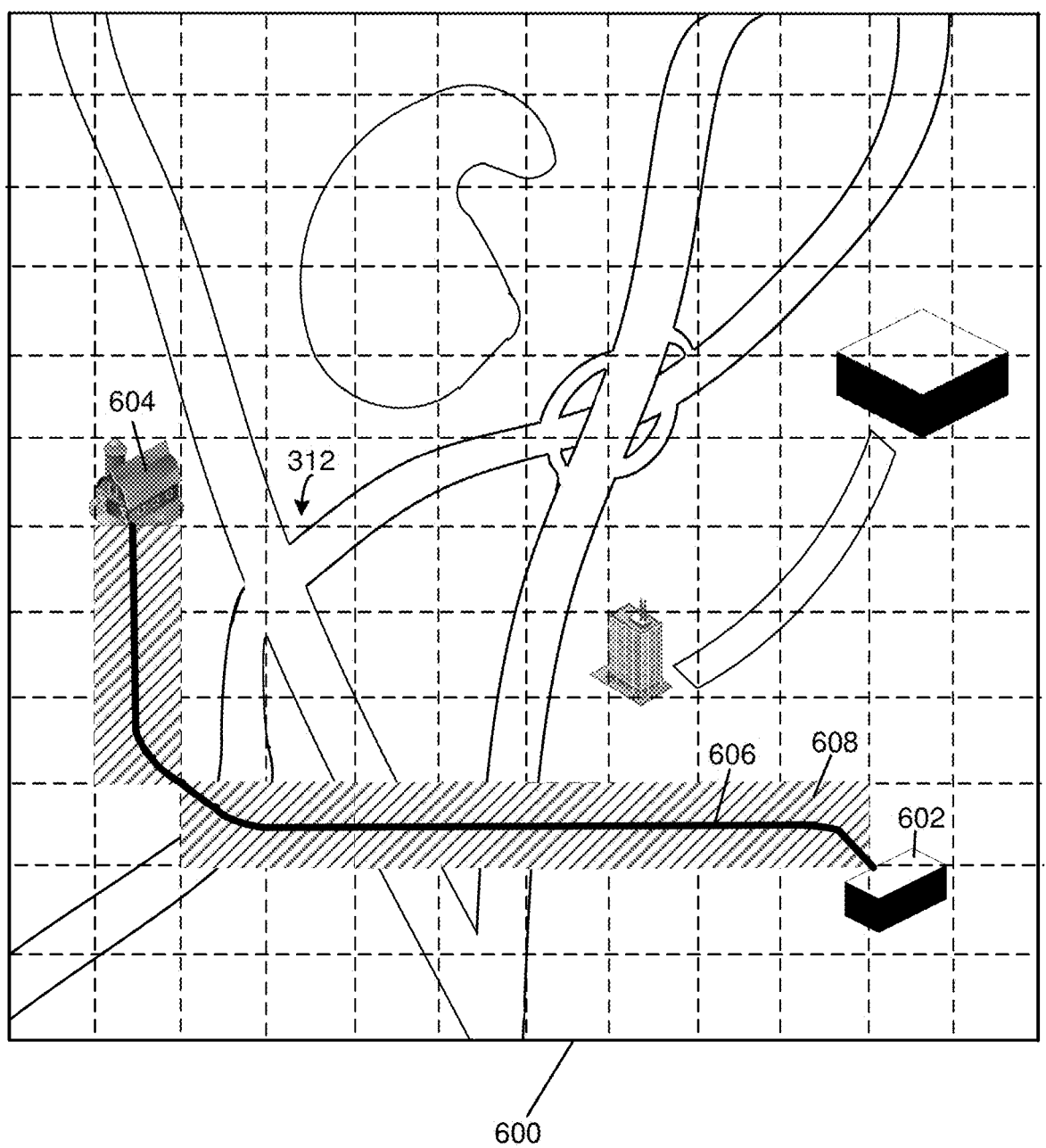
FIG. 6 illustrates the grid map of FIG. 3 with a drone route added that is generated according to at least one embodiment using the various processes and features shown in the other drawings and that includes highlights of the map areas passed through via the drone route.

In a step 206 of the second process 200, drone departure location information is received. In some embodiments, the drone departure location information is received via a data transmission from an external computer via the wide area network 802 shown in FIG. 8 to the computer 801. At the computer 801, the drone departure location information flows to the map and matrix coordination for drone route determination program 816. FIG. 6 shows a drone route map 600 that includes a drone departure location 602. The drone departure location 602 indicates a location from which a drone is expected to depart to perform a drone flight, e.g., to make a delivery of a parcel. In some embodiments, the drone departure location 602 includes latitude and longitude coordinates of the departure location. In some embodiments in which the drone operator owns an instance of the program 816 and sends drones from the same departure location repeatedly, this drone departure location information is stored in memory of or accessible to the computer 801, e.g., in the persistent storage 813. In such embodiments, the reception of step 206 includes an intra-computer transmission within the computer 801 so that stored data is sent to the program 816.

In a step 208 of the second process 200, drone delivery location information is received. In some embodiments, the drone delivery location information is received via a data transmission from an external computer via the wide area network 802 shown in FIG. 8 to the computer 801. At the computer 801, the drone delivery location information flows to the map and matrix coordination for drone route determination program 816. The drone route map 600 of FIG. 6 includes a drone delivery location 604. The drone delivery location 604 indicates a location to which a drone is expected to travel to complete a drone flight, e.g., to make a delivery of a parcel. In some embodiments, the drone delivery location 604 includes latitude and longitude coordinates of the delivery location. In some embodiments in which a consumer orders a product and requests delivery of the product via drone delivery, the consumer provides a delivery address as part of the transaction and this delivery address is provided as the drone delivery location information for step 208. The drone operator may already have access to this address or may receive this address from the parcel provider.

In at least some embodiments, the program 816 with an initiator function requests the delivery location information to the calling service and, in response, receives latitude and longitude tuple information for the delivery location.

In a step 210 of the second process 200, a determination is made whether a route safety check has already been performed for this departure/destination combination. The departure/destination combination refers to (1) the drone departure location for which information was received in step 206 and (2) the drone delivery location for which information was received in step 208. If the determination of step 210 is affirmative in that a route safety check has already been performed for this departure/destination combination, the second process 200 proceeds to step 212. If the determination of step 210 is negative in that a route safety check has not already been performed for this departure/destination combination, the second process 200 proceeds to step 214. If the program 816 has previously analyzed a particular departure/destination combination to find an acceptable direct route and/or an improved safety route for a drone to travel from the departure location to the destination, then step 210 is affirmative and the program 816 does not need to perform again the analysis. Instead, the program 816 relies on the previous analysis. The program 816 accesses and/or stores in its internal data storage a list of departure/destination combinations for which the analysis has already been made. A table may be generated that lists all departure/destination combinations for which the analysis has already been made. By using an already determined route that was determined by a previous iteration of the steps of the second process 200, the program 816 relies on the safety matrix and on the analysis of the direct route without needing to reperform the analysis.

In some instances, the departure/destination combination is not an exact match to a stored and previously-analyzed combination but is nearby a stored and previously-analyzed combination. In some embodiments, the program 816 also performs a comparison to a pre-determined threshold as part of step 210. A distance between the departure locations of the nearby new combination and of the previously analyzed combination and another distance between the destination locations of the nearby new combination and of the previously analyzed combinations are determined and compared to pre-determined threshold values. In some instances, the distances are deemed to be small enough and below the threshold so that the delivery route for the previously analyzed combination is usable for the new combination. In some instances, the distances are deemed to equal or to exceed the threshold so that the delivery route for the previously analyzed combination is not usable for the new combination and the new analysis should be performed. The threshold is based on user selection or on determination via the program 816 based on previous success of drone deliveries that relied on previously determined routes for nearby locations.

In a step 214 of the second process 200, one or more safety matrices are analyzed to check for dangers along the direct route. The one or more safety matrices refers to those matrices that were created in step 106 and stored in step 108 and/or to those matrix combinations that were created in step 116 and were stored in step 118. To perform step 214, the program 816 uses classifying information of the departure/destination combination to search a library of matrices to find the one or more matrices that matches the current departure/destination combination that is to be analyzed.

In at least some embodiments, the analysis of step 214 includes (A) identifying all map sub-regions through which the direct route runs/passes above and (B) checking the matrix values for the matrix elements which correspond respectively to those sub-regions. FIG. 7A shows an example map 702 that includes an example direct route 720 between an example departure location 704 and an example destination location 706. The example direct route 720 represents a straight line and/or approximately a straight line between the departure and destination locations 704, 706. To perform step 214, each map area which the example direct route 720 crosses/passes above is identified and analyzed for the safety information. In FIG. 7A multiple map sub-regions shown as squares with cross-hatching are identified as those sub-regions above which the example direct route 720 passes. An example passed-over sub-region 708 is labelled in FIG. 7A. In the example of FIG. 7A, the example direct route 720 runs through/passes above eleven such square sub-regions including the example passed-over sub-region 708. The number of crossed sub-regions and identifying indicators of each square sub-region is determined and stored to use for the analysis of step 214. In at least some embodiments, these identifying indicators refer to the position within the map section based on the overall number of sub-regions within that map section. For example, the example passed-over sub-region 708 is identified as being in the ninth row and fifth column of the various sub-regions within the example map 702. These identifiers are used to find corresponding matrix elements within the one or more safety matrices that represent this example map 702. For example, for the example passed-over sub-region 708 a numerical value of a matrix element in the ninth row and fifth column of the matrix representing this example map 702 is copied and retrieved and used for the analysis of step 214. Similar steps are taken to retrieve values from the other ten sub-regions which are crossed/passed over by the example direct route 720.

The present embodiments are based on the usage of vertex-weighted graphs. Edge weights between sub-regions are counted as zero so that the vertex weights and not the edge weights effect the summation score for a path. Sub-regions with low-risk scores are used and injected into the adaptive machine learning model to generate the alternate route. The generated alternate route is supplied to the drone station and tracked for real time progress.

In some embodiments, the sub-regions are two-dimensional for example in a repeating shape such as a square. Other shaped such as rectangles may also be used as long as the selected shape is consistent throughout the map and can be arranged in rows and columns. In other embodiments with a three-dimensional map system, the sub-regions are three-dimensional such as in the form of a cube. The drawings herein for simplicity depict square sub-regions that are two-dimensional.

In some embodiments, the start and end locations for the drone route are injected into the safety mapper classes. Matrix-based weightage calculations are applied on the latitude and longitude information. Generally-defined routs are fed into the matrix-based safety routing engine to identify the elements of risk. A ground-truth matrix of the safety routing engine is generated depending on the area, nature, and intersections, etc. The base values are added into the two-dimensional structure. The <x, y> axis information received and the initial map are injected into the safety routing engine of the program 816 once the baselines are generated and depending on that the road intersections that are identified.

In a step 216 of the second process 200, a determination is made whether a danger is identified along the direct route. The direct route refers to the direct route that was generated in step 214. If the determination of step 216 is affirmative in that a danger is identified along the direct route, the second process 200 proceeds to step 218. If the determination of step 216 is negative in that no danger is identified along the direct route, the second process 200 proceeds directly to step 220 and skips step 218.

This determination of step 216 occurs as a natural result of step 214 of analyzing the safety matrix/matrices to check for the dangers. In some embodiments, the determination of step 216 occurs by comparing the matrix values (in the matrix element positions corresponding to the drone route paths) individually to a threshold level. The threshold is based on user selection, e.g., a pre-determined user selection via a user interface of the program 816, or on automated and/or default determination via the program 816 based on previous success of drone deliveries that relied on previously determined routes for nearby locations.

In at least some embodiments, the threshold is also based on a number of matrices that were combined together, e.g., added together, in one or more iterations of step 116, with the threshold amount/number increasing for an increasing number of matrices that were combined together. For example, if the analyzed matrix is based on a single matrix from a single safety factor the threshold value is a starting value. If the analyzed matrix is based on a combined matrix formed from a combination of two matrices then the threshold value is a second value that is higher than the starting value. If the analyzed matrix is based on a combined matrix formed from a combination of three matrices then the threshold value is a third value that is higher than the second value. This pattern for threshold determination is repeatable for matrices formed from various numbers of matrices. This reliance on number of matrices helps calibrate for higher values resulting from more matrix elements being joined together.

In some embodiments, the analysis of step 214 and the determination of step 216 also take account how much distance a direct route uses to pass through a particular map sub-region. For example, if the direct route passes through a small corner of the sub-region, then the safety factor value for that sub-region is weighted downward for the calculation. If the direct route passes through a maximum length of the region, then the safety factor value for that sub-region is given a full weight for that direct route. For example, if the weighting occurs from a scale of 0 to 1, the safety factor value for the direct route running through a small section at the corner of the sub-region is weighted with a 0.1 weight, but if the direct route runs through a maximum section (e.g., corner to corner of a square) then the safety factor value receives a 1.0 weight. In another embodiment, a direct route running through corner to corner of a square receives a weight greater than 1.0 (e.g. a weight of 1.41), a direct route running side to side of a square receives a weight of 1.0, and a direct route running through a small corner section only of the square receives a weight of 0.1. In this embodiment, the safety factor value is adjusted via the distance-adjusted weight before being compared against the threshold value.

The comparison against a threshold is done iteratively for each sub-region which the direct route crosses.

In some embodiments, if the threshold is exceeded for a single sub-region then the determination of step 216 is considered to be affirmative by the program 816. In some embodiments, an additional threshold is set for a minimum number greater than one of sub-regions which need to cross the first threshold before the determination of step 216 is considered to be affirmative by the program 816. For example, a user could select that two sub-regions must cross the factor threshold to trigger the affirmative determination of step 216. In that instance a user may decide that they can live with a higher level of risk (in favor of using the fastest route) and will set this number of sub-regions being dangerous threshold to be higher (e.g., greater than one).

In a step 218 of the second process 200, the matrix or matrices are used to identify an alternate route with increased safety. The same matrix or matrices that are analyzed in step 214 and step 216 are also used in step 218 to identify the alternate route. In at least some embodiments, this identification is based on finding one or more alternative routes with a respective reduced score as compared to the score of a threshold-crossing sub-region of the direct route and/or compared to the score of the entire direct route routes.

For embodiments which use an entire direct route safety score in step 218 for the comparison to alternate routes, a summation algorithm is used to sum the individual matrix safety value scores for the various sub-regions crossed by the direct route. For each map sub-region which is crossed by the direct route, a respective safety factor value from the matrix is retrieved and added to a direct route summation score. Thus, the summation occurs from 0 to i for a number "i" of the map sub-regions which are crossed/passed over by the direct route. The respective safety factor value may be taken directly from the matrix element from the determination on the original safety data or from the matrix element adjusted by a weight based on amount of the sub-region crossed.

The program 816 automatically tries alternate routes through the vicinity and calculates entire route summation scores for these alternate routes. The program in some embodiments selects an alternate route with the lowest total route summation score as an alternate route to suggest for the drone to take for the drone flight/parcel delivery.

In some embodiments, the program 816 performs a hill climbing algorithm as part of step 218 to find an alternate route with a lower total safety score than the total safety score of the direct route. In some embodiments the direct route is relied upon and the hill climbing algorithm is withheld until the first sub-region is reached which exceeded the safety threshold. In response to reaching that first "dangerous" sub-region, the hill climbing algorithm is applied. At that point, the route may try alternate routes forwards (or working backwards) from that specific sub-region. For three-dimensional systems, the hill climbing also applies changes in altitude to find alternate paths with reduced safety scores.

In some embodiments, the alternate route identified also must have no safety factor value for any sub-region (that the alternate route crosses/passes over) that exceeds the individual sub-region safety threshold that was used for steps 214 and 216. In some embodiments, the alternate route must not exceed whatever particular threshold value was used in steps 214 and 216.

Figure 7B:
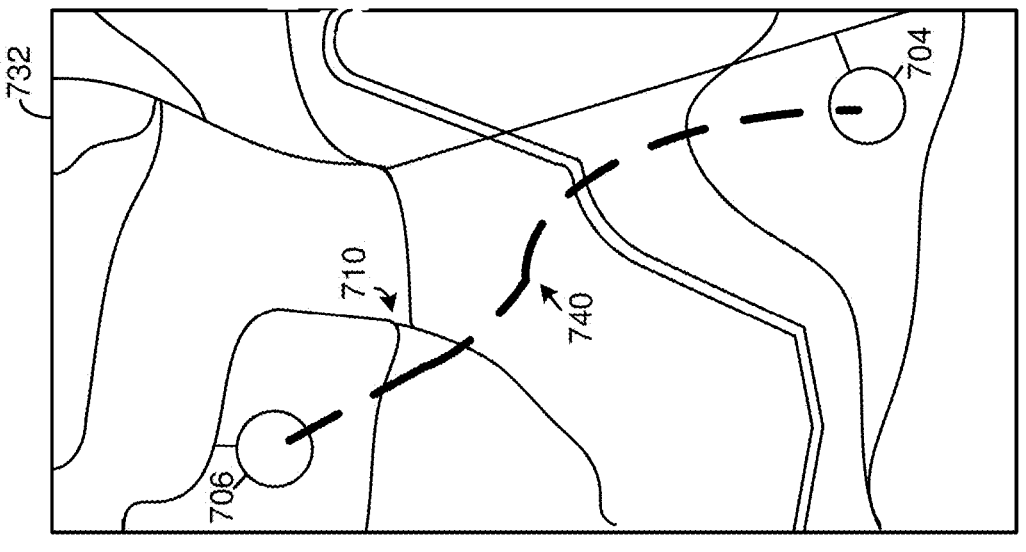
FIGS. 7A and 7B illustrate a direct route (FIG. 7A) compared to an alternative drone route (FIG. 7B) that are generated according to at least one embodiment using the various processes and features shown in the other drawings with the alternative drone route achieving enhanced safety of the drone during a flight along the route.
Figure 7A:
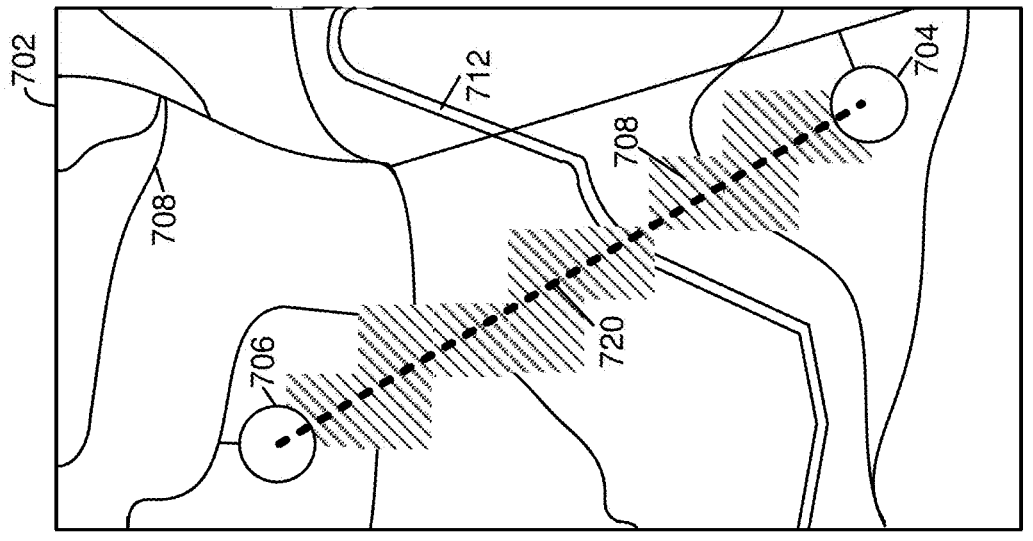

FIG. 7B shows an example of an alternative route 740 being identified in response to the direct route 720 being deemed as dangerous via the first analysis (of steps 214 and 216). Although the map sub-regions are not shown throughout the entire maps 702, 732 shown in FIGS. 7A and 7B, respectively, the alternative route 740 is identified using one or more of the various techniques described above for step 218. Both the direct route 720 and the alternative route 740 proceed from the same departure location 704 to the same destination location 706. The alternative path 740 curves around and avoids some portions of the original path, i.e., the direct route 720, which were deemed to be dangerous.

In a step 220 of the second process 200, a message that indicates the determined route is transmitted to the drone.

This transmission occurs in some embodiments via a data transmission from the computer 801 with the program 816 via the wide area network 802 shown in FIG. 8 to an external computer associated with the drone, e.g., an external computer that is part of a control system of the drone. In some instances, this external computer is disposed directly on the drone. The drone is then able to use the route to direct its flight from the departure location to the destination location. In some embodiments, the drone performs and completes the flight and updates the program 816 with a confirmation of success or of any unsuspected difficulties along the path which are then used by the program 816 to update the safety matrices in an automated manner.

In a step 222 of the second process 200, the program storage is updated with route information for a new departure/destination combination. This information is stored in computer data storage such as in the persistent storage 813 of the computer 801 and/or in additional storage accessed via the cloud such as in one or more remote servers 804. The new combination information is stored in a manner so as to be accessible to the program 816 in performing additional iterations of the second process 200 shown in FIG. 2 for determining a best safe route for another drone flight. This data includes the new route that was determined. This data can also include the actual flight results and success/failure of an intended delivery.

In a step 212 of the second process 200, the route that is saved in the memory for this departure/destination combination is accessed. This step 212 occurs after an affirmative determination of step 210 that this departure/destination combination has already been checked. Because this combination is already checked, a speedier outcome is achieved by accessing the previously determined route instead of newly performing the safety check. The route that is accessed is a direct route or an alternative route depending on the results of the previous safety check that was performed and, in some instances, depending on current temporal information and/or parcel information that is received. This accessing of the data of step 212 occurs via retrieval from computer memory such as the persistent storage 813 of the computer 801 and/or additional storage accessed via the cloud such as in one or more remote servers 804.

After step 212, this branch of the second process 200 proceeds directly to step 220 for transmitting the determined route to the drone. Then after performance of step 220 step 222 is able to be skipped because a new combination route information was not determined in this iteration. Actual flight and/or delivery results are also collected and used to update the stored matrices and program 816.

Machine learning models may be implemented for the various steps of the drone safety check programs shown in FIGS. 1 and 2. Such machine learning models may include naive Bayes models, random decision tree models, linear statistical query models, logistic regression n models, neural network models, e.g. convolutional neural networks, multi-layer perceptrons, residual networks, long short-term memory architectures, algorithms, deep learning models, deep learning generative models, and other models. Training data includes past departure/destination location combinations with safety information, and direct route check and alternative route comparison outcomes for those location combinations. The learning algorithm, in training the machine learning models in question, finds patterns in input data in order to map the input data attributes to the target. The trained machine learning models contain or otherwise utilize these patterns so that the recommendations and recognition can be predicted for similar future inputs. A machine learning model may be used to perform safety checks on direct routes and for alternate routes. The machine learning model uses the patterns that are identified to determine what the appropriate route recommendation decisions are for future data to be received and analyzed. As samples are being provided, training of the one or more machine learning models may include supervised learning by submitting prior data sets to an untrained or previously-trained machine learning model. In some instances, unsupervised and/or semi-supervised learning for the one or more machine learning models may also be implemented.

It may be appreciated that FIGS. 1 and 2 provide illustrations of some embodiments and do not imply any limitations with regard to how different embodiments may be implemented. Many modifications to the depicted embodiment(s), e.g. to a depicted sequence of steps, may be made based on design and implementation requirements.

FIG. 3 illustrates a first map 300 that is a latitude and longitude grid map and that may be involved in the processes of FIGS. 1 and 2. A geographical area depicted by the first map 300 shown in FIG. 3 is divided into map areas, such as a first map area 302, via the combination of latitude and longitude lines. FIG. 3 shows a first latitude line 304 amongst other latitude lines and a first longitude line 306 amongst other longitude lines. The first map 300 depicts a body of water 310, various roads such as a first highway 308, and road intersections such as the first intersection 312. The first map 300 also depicts various human structures such as a barn, a high-rise building, and a warehouse. In some intersections, road intersections are weighted in the matrix element as being especially dangerous areas for drones to cross (above in the air) due to their high traffic. Dropping a parcel in that intersection area is considered especially dangerous and undesirable.

FIG. 4A illustrates safety matrices namely a first example matrix 402 and a second example matrix 404. These two matrices 402, 404 represent different safety factors for a single geographical area and are combined in a combination action 406 shown in FIG. 4A as a part of matrix-based drone route safety checks. The first example matrix 402 has a range of safety factor values (zero to ten) that is different than the binary range (zero or one) of the safety factor values of the second example matrix 404.

FIG. 4B illustrates another set of safety matrices namely the first example matrix 402 that was shown in FIG. 4A and also a third example matrix 414. The third example matrix 414 has the same dimensions as the first and second example matrices 402, 404 and also has the same range of safety factor values (zero to ten) that the first example matrix 402 has. Thus, the third example matrix 414 represents values of a different safety factor than are represented by the first example matrix 402 or represents values of the same safety factor as represented by the first example matrix 402 but for different temporal conditions (e.g., time of day, season, etc.). In at least some embodiments, the first example matrix 402 and the third example matrix 414 are combined in a second combination action 416 (second as compared to the other combination action 406 shown in FIG. 4A). Thus, based on a desired time/day for a flight updated safety checks are performed and alternate routes are identified if necessary.

Figure 4C:
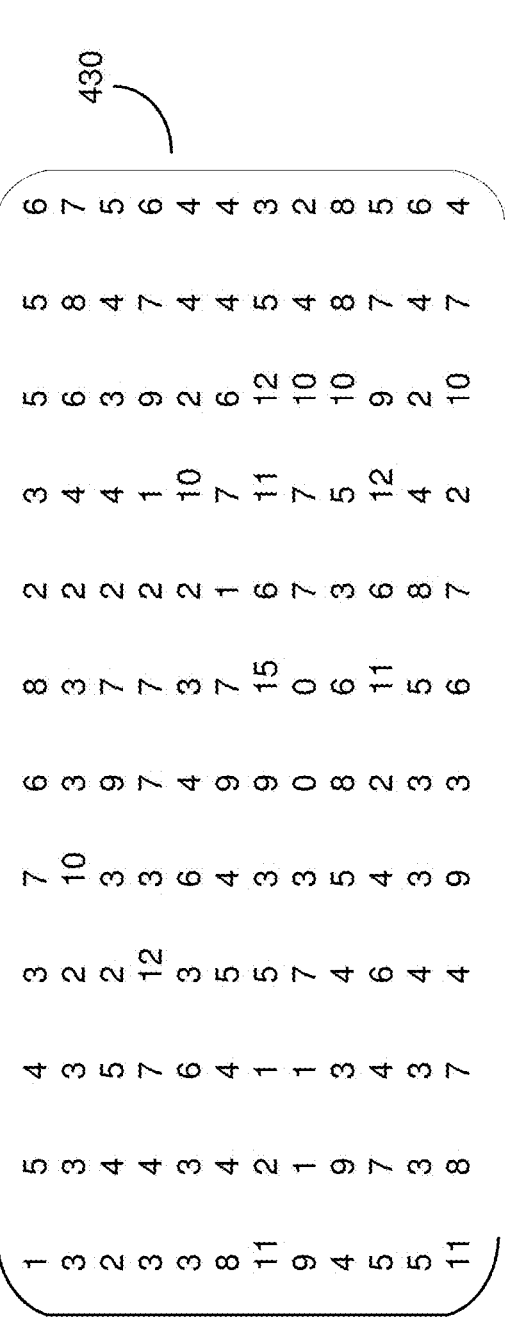
FIG. 4C illustrates an output safety matrix that according to at least one embodiment may be generated via the combination of the two safety matrices shown in FIG. 4B.

FIG. 4C illustrates an output safety matrix 430 that according to at least one embodiment is generated via the combination of the first and third example matrices 402, 414 shown in FIG. 4B. Thus, the output safety matrix 430 is generated via the second combination action 416. For each matrix position, respectively, a value of the first example matrix 402 is added to a correspondingly-positioned value of the third example matrix 414 to produce the correspondingly-positioned value for the output safety matrix 430.

Figure 5:
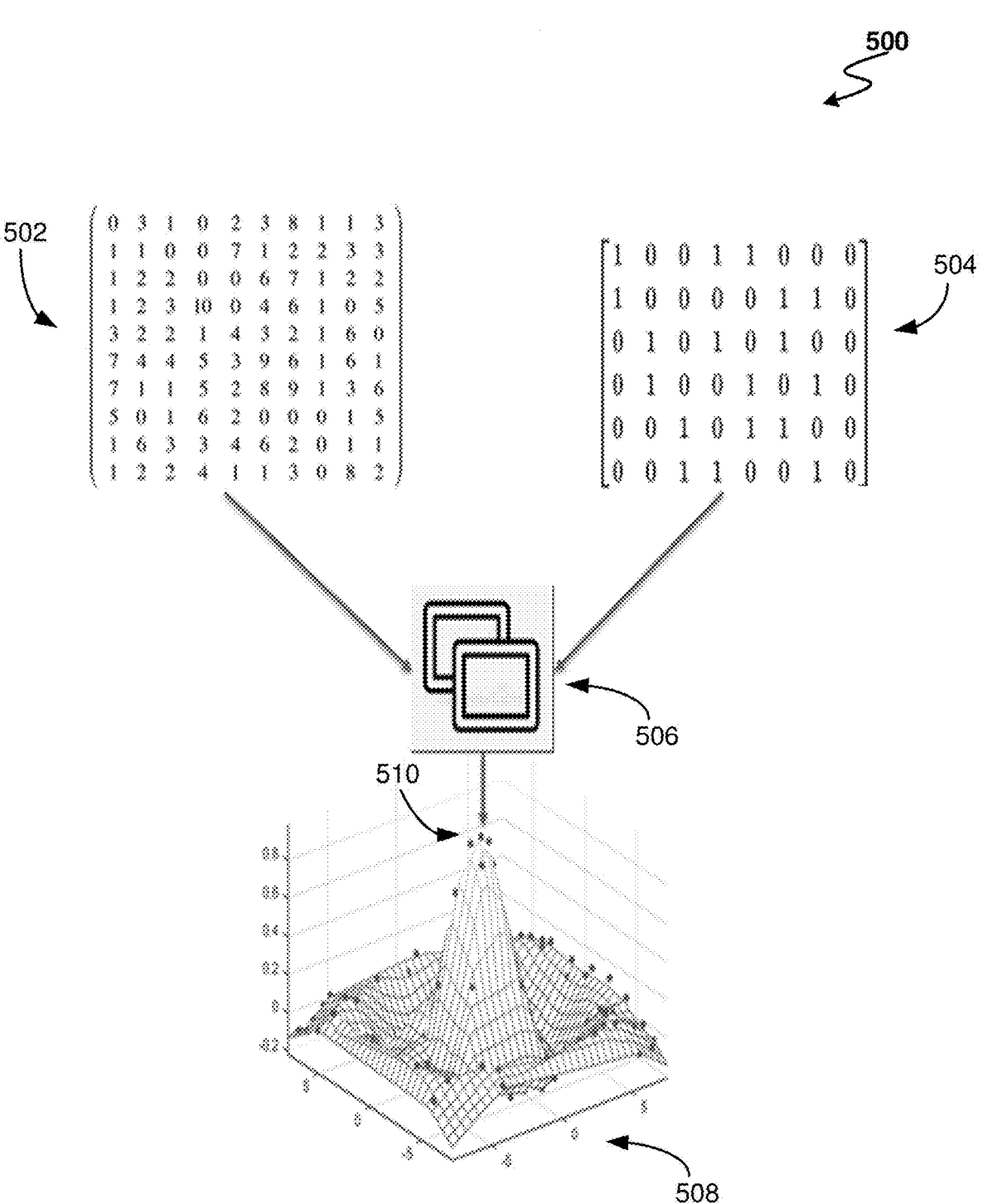
FIG. 5 illustrates an embodiment that implements matrix combination and analysis and shows a tensor with a peak indicating a danger region.

FIG. 5 illustrates another matrix combination and analysis procedure 500. A left matrix 502 represents first safety factor values (e.g., bird presence) for a particular region. A right matrix 504 represents second safety factor values (e.g., road presence) for the same particular geographical region. The left matrix 502 and the right matrix 504 are combined with each other in multi-matrix combination action 506. These aspects are similar to those shown in FIGS. 4A-4C and described for FIG. 2.

FIG. 5 also shows a three-dimensional tensor map 508 of the combined matrix formed via the combination of the left and right matrices 502, 504 in the multi-matrix combination action 506. As part of the three-dimensional map 508, a danger peak 510 is present and identified indicating a high score for a particular region of the combination matrix that represents a particular portion of the geographical area. The danger peak 510 in at least some embodiments is higher than a threshold value and triggers the automated generation of alternate routes which would avoid this sub-area of the geographical area. Although FIG. 5 shows the three-dimensional map 508 being generated from a combined safety matrix, three-dimensional maps in other embodiments are also generated for single safety matrices to analyze their results. The intersection points of high weightage scores are identified as point of attraction. The number of points of attractions are located from the computation. If a number of the points of attraction are more than a threshold value, then the route change engine of program 816 is activated to navigate the baseline map to minimize the risk of the drone flight.

It may be appreciated that FIGS. 3, 4A, 4B, 4C, and 5 provide illustrations of some embodiments and do not imply any limitations with regard to how different embodiments may be implemented. Many modifications to the depicted embodiment(s), e.g., the visual features shown, may be made based on design and implementation requirements.

FIG. 6 illustrates a drone route map 600 that is based off of the first map of FIG. 3. The drone route map 600 includes a first alternative route 606 that is generated in place of a direct route between a drone departure location 602 and a drone destination location 604. The first alternative route 606 is generated due to safety concerns with a direct route between the drone departure location 602 and the drone destination location 604. The first alternative route 606 included a lower, e.g., better, risk score compared to the risk score of the direct route between locations 602, 604. The risk score for the first alternative route 606 was determined using summation of risk values for each square sub-region through which the alternative route 606 crosses. A first square sub-region 608 is labelled in FIG. 6. The alternative route 606 crosses a total of eleven square sub-regions of the drone route map 600. In some implementations of the various embodiments, the sub-regions are each of equal size for consistency of score valuations. The alternative route 606 avoids flying over the first intersection 312 to improve the safety of the drone route. The alternative route 606 curves around the region of this first intersection 312, e.g., due to concerns about the danger of dropping a package into such a busy intersection region with high vehicular traffic.

FIGS. 7A and 7B illustrate a comparison of a direct route and an alternative route generated via the discussed matrix-based safety check and to increase a safety of the drone flight. FIG. 7A shows an example map 702 that includes an example direct route 720 between an example departure location 704 and an example destination location 706. The direct route 720 represents a straight line and/or approximately a straight line between the departure and destination locations 704, 706. Each map sub-region over which the drone would fly along the example direct route 720 is identified and analyzed for the safety information. In FIG. 7A multiple such crossed/passed-above map sub-regions are shown as squares with cross-hatching are identified. The direct route 720 flies over each of these identified sub-regions. An example sub-region 708 is labelled in FIG. 7A. In the example of FIG. 7A, the example direct route 720 runs through/passes above eleven such square sub-regions including the example sub-region 708. The example map 702 also shows various roads indicated by the single lines such as east-west road 708. The example map 702 also shows a river 712 indicated by the double lines.

The alternative route map 732 shown in FIG. 7B is based off of the example map 702 of FIG. 7A but depicts the alternate route 740. This alternate route 740 is identified in response to the direct route 720 being deemed as dangerous via the first analysis of steps 214, 216. Although the map sub-regions are not shown throughout the entire alternate route map 732 shown in FIG. 7B, the alternate route 740 is identified using one or more of the various techniques described above with respect to the other drawings and FIGS. 1 and 2. Both the direct route 720 and the alternate route 740 proceed from the same departure location 704 to the same destination location 706. The alternate path 740 curves around and avoids some portions of the original path, i.e., direct route 720, which were deemed to be dangerous.

It may be appreciated that FIGS. 6, 7A, and 7B provide illustrations of some embodiments and do not imply any limitations with regard to how different embodiments may be implemented. Many modifications to the depicted embodiment(s), e.g., the visual features shown, may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 shown in FIG. 8 contains an example of an environment for the execution of at least some of the computer code involved in performing the inventive methods, such as map and matrix coordination for drone route safety determination program 816. In addition to the drone matrix-based safety check program 816, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and drone matrix-based safety check program 816, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 5. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip."

In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in drone matrix-based safety check program 816 in persistent storage 813.

COMMUNICATION FABRIC 811 is the signal conduction routes that allows the various components of computer 801 to communicate with each other. Typically, this fabric is made of switches and electrically conductive routes, such as the switches and electrically conductive routes that make up busses, bridges, physical input/output ports and the like. Other types of signal communication routes may be used, such as fiber optic communication routes and/or wireless communication routes.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in drone matrix-based safety check program 816 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN 802 and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

A computer system with the drone safety check program operates as a special purpose computer system in which a drone safety check process assists in the performance of safe drone flights. In particular, the drone safety check program transforms a computer system into a special purpose computer system as compared to currently available general computer systems that do not have the drone safety check program. The system can employ hardware and/or software to solve problems that are highly technical in nature, that are not abstract and that cannot be performed as a set of mental acts by a human. For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. The speed required to perform the route safety checking and alternative route generation for practical use necessitates implementation of the described method on the specialized computer with the program 816 as described herein.

What is claimed is:

1. A computer-implemented method comprising:
receiving, via a first computer, a message indicating a destination location for a drone flight;
generating, via the first computer, a first recommendation for a route from a departure location to the destination location for the drone flight, wherein the generating comprises:
relying on multiple safety matrices representing a geographical area that includes the departure and destination locations, each safety matrix of the multiple safety matrices comprising respective rows and columns of numbers, each number representing a safety factor for a respective portion of a map that illustrates the geographical area, each of the multiple safety matrices representing a different vertical layer of a three-dimensional map;
relying on a first analysis regarding a direct route between the departure and destination locations, the first analysis includes analyzing values of the multiple safety matrices along portions representing the direct route;
wherein the route includes at least one change for an altitude of a drone flying in airspace, the at least one change for the altitude resulting in increased safety for the flight;
in response to the first analysis indicating that the direct route has a safety risk exceeding a threshold value, relying on alternative route comparison that uses a respective summation of values of the multiple safety matrices along additional portions representing alternative routes, respectively; and
selecting the first recommendation from the alternative routes based on the alternative route comparison, wherein the alternative route comparison weights a respective matrix value based on a respective length the respective alternative route passes through a map sub-region corresponding to a matrix position of the respective matrix value; and
transmitting the first recommendation and the route to the drone to control the drone for the drone flight along the route including along the at least one change.

2. The computer-implemented method of claim 1, wherein the alternative route comparison comprises applying a hill climbing algorithm to the first safety matrix.

3. The computer-implemented method of claim 1, wherein the multiple safety matrices are based on bird presence in the geographical area.

4. The computer-implemented method of claim 3, wherein the multiple safety matrices are based on bird sensing performed via one or more satellites.

5. The computer-implemented method of claim 3, wherein the multiple safety matrices are based on roads and on traffic conditions along the roads.

6. The computer-implemented method of claim 1, wherein each of the multiple safety matrices comprises a respective combined safety matrix being formed by combining a first safety matrix and a second safety matrix, each of the respective first and second safety matrices comprising rows and columns of numbers, each number representing a first safety factor for the respective portions of the map for the first safety matrices and a second safety factor for the respective portions of the map of the second safety matrices, the second safety factor being different from the first safety factor;

wherein the first analysis includes analyzing values of the combined safety matrices along the portions representing the direct route.

7. The computer-implemented method of claim 6, wherein the combining adds the values of the second safety matrix to values in corresponding positions of the first safety matrix for each respective portion of the map.

8. The computer-implemented method of claim 6, wherein the first safety matrix is based on bird presence in the geographical area and the second safety matrix is based on roads in the geographical area.

9. The computer-implemented method of claim 6, wherein the first analysis weights a respective matrix value based on a respective length the direct route passes through a map sub-region corresponding to a matrix position of the respective matrix value.

10. The computer-implemented method of claim 1, further comprising:

receiving temporal information about a desired time for the drone flight; and selecting the first safety matrix from a stored library of sets of safety matrices based on the temporal information.

11. The computer-implemented method of claim 1, further comprising:

receiving parcel information about a parcel to be delivered via the drone flight; and performing the first analysis further based on the parcel information.

12. The computer-implemented method of claim 1, wherein a number of the rows of each of the multiple safety matrices equals a number of latitudinal divisions on the map, and a number of the columns of each of the multiple safety matrices equals a number of longitudinal divisions on the map.

13. The computer-implemented method of claim 1, wherein the first analysis weights a respective matrix value based on a respective length the direct route passes through a map sub-region corresponding to a matrix position of the respective matrix value.

14. A computer system comprising:

one or more processors, one or more computer-readable tangible storage media, and program instructions stored on at least one of the one or more computer-readable tangible storage media for execution by at least one of the one or more processors to cause the computer system to:

receive a message indicating a destination location for a drone flight;

generate a first recommendation for a route from a departure location to the destination location for the drone flight, wherein the generating comprises:

relying on multiple safety matrices representing a geographical area that includes the departure and destination locations, each safety matrix of the multiple safety matrices comprising respective rows and columns of numbers, each number representing a safety factor for a respective portion of a map that illustrates the geographical area, each of the multiple safety matrices representing a different vertical layer of a three-dimensional map;

relying on a first analysis regarding a direct route between the departure and destination locations, the first analysis includes analyzing values of the multiple safety matrices along portions representing the direct route;

wherein the route includes at least one change for an altitude of a drone flying in airspace, the at least one change for the altitude resulting in increased safety for the flight;

in response to the first analysis indicating that the direct route has a safety risk exceeding a threshold value, relying on alternative route comparison that uses a respective summation of values of the multiple safety matrices along additional portions representing alternative routes, respectively; and selecting the first recommendation from the alternative routes based on the alternative route comparison, wherein the alternative route comparison weights a respective matrix value based on a respective length the respective alternative route passes through a map sub-region corresponding to a matrix position of the respective matrix value; and transmitting the first recommendation and the route to the drone to control the drone for the drone flight along the route including along the at least one change.

15. The computer system of claim 14, wherein the alternative route comparison comprises applying a hill climbing algorithm to the multiple safety matrices.

16. A computer program product comprising a computer-readable storage medium having program instructions embodied therewith, the program instructions being executable by a computer to cause the computer to:

receive a message indicating a destination location for a drone flight;

generate a first recommendation for a route from a departure location to the destination location for the drone flight, wherein the generating comprises:

relying on multiple safety matrices representing a geographical area that includes the departure and destination locations, each safety matrix of the multiple safety matrices comprising respective rows and columns of numbers, each number representing a safety factor for a respective portion of a map that illustrates the geographical area, each of the multiple safety matrices representing a different vertical layer of a three-dimensional map;

relying on a first analysis regarding a direct route between the departure and destination locations, the first analysis includes analyzing values of the multiple safety matrices along portions representing the direct route;

wherein the route includes at least one change for an altitude of a drone flying in airspace, the at least one change for the altitude resulting in increased safety for the flight;

in response to the first analysis indicating that the direct route has a safety risk exceeding a threshold value, relying on alternative route comparison that uses a respective summation of values of the multiple safety matrices along additional portions representing alternative routes, respectively; and selecting the first recommendation from the alternative routes based on the alternative route comparison, wherein the alternative route comparison weights a respective matrix value based on a respective length the respective alternative route passes through a map sub-region corresponding to a matrix position of the respective matrix value; and transmitting the first recommendation and the route to the drone to control the drone for the drone flight along the route including along the at least one change.

17. The computer program product of claim 16, wherein the alternative route comparison comprises applying a hill climbing algorithm to the first safety matrix.

18. The computer program product of claim 16, wherein the multiple safety matrices are based on bird presence in the geographical area.

19. The computer program product of claim 18, wherein the multiple safety matrices are based on bird sensing performed via one or more satellites.

20. The computer program product of claim 16, wherein each of the multiple safety matrices comprises a respective combined safety matrix being formed by combining a first safety matrix and a second safety matrix, each of the respective first and second safety matrices comprising rows and columns of numbers, each number representing a first safety factor for the respective portions of the map for the first safety matrices and a second safety factor for the respective portions of the map of the second safety matrices, the second safety factor being different from the first safety factor;

wherein the first analysis includes analyzing values of the combined safety matrices along the portions representing the direct route.

* * * * *